United States Patent [19]

Greenslade

[11] Patent Number: 5,619,805
[45] Date of Patent: Apr. 15, 1997

[54] DEVICE FOR MEASURING WRENCHING HEIGHT OF HEXAGONAL HEAD FASTENERS

[76] Inventor: Joe E. Greenslade, 2118 Edwin St., Fort Worth, Tex. 76110

[21] Appl. No.: 496,200

[22] Filed: Jun. 28, 1995

[51] Int. Cl.⁶ .................................................. G01B 3/22
[52] U.S. Cl. ............................................. 33/833; 33/557
[58] Field of Search .................................. 33/201, 501.07, 33/501.1, 549, 556, 557, 558, 828, 832, 833, 834, 836

[56] References Cited

U.S. PATENT DOCUMENTS

| | | | |
|---|---|---|---|
| 1,266,977 | 5/1918 | Nelis | 33/836 |
| 1,643,570 | 9/1927 | Bartholdy | 33/557 |
| 2,529,988 | 11/1950 | Zempel | 33/836 |
| 4,653,191 | 3/1987 | Gasser | 33/833 |
| 4,905,378 | 3/1990 | Culver et al. | 33/833 |
| 4,936,024 | 6/1990 | Greenslade | 33/836 |
| 5,097,423 | 3/1992 | Badinger | 33/833 |
| 5,182,866 | 2/1993 | Heymann | 33/549 |

OTHER PUBLICATIONS

ISO 7043–1983 (E)Annex "Gauging of hexagon nut and flange", p. 652.

Abstract of ANSI/ASME B18.6.4 1981, "Hex Washer Head Tapping Screws", pp. H–45 and H–47.

*Primary Examiner*—G. Bradley Bennett
*Attorney, Agent, or Firm*—James E. Bradley

[57] ABSTRACT

A device for measuring the wrenching height of hexagonal head fasteners has a height indicator having an indicator shaft which extends therefrom. The height indicator is actuable by reciprocal movement. A gaging element housing is coupled to the height indicator and has an interior bore with a longitudinal axis with indicator shaft extending into the interior bore. A gaging ring is fixed to gaging element housing and has a central opening of a size selected as a minimum diameter for receiving a hexagonal head of a fastener to be measured. At least three gaging pins are received within pin holes of the gaging ring. Thin gaging pins reciprocate within the pin holes between an inward and outward position. By positioning the gaging ring over a hexagonal head of the fastener being measured, the gaging pins will engage a washer surface so that they are forced inward, actuating the indicator shaft of the height indicator so that the wrenching height of the hexagonal head fastener is measured.

18 Claims, 3 Drawing Sheets

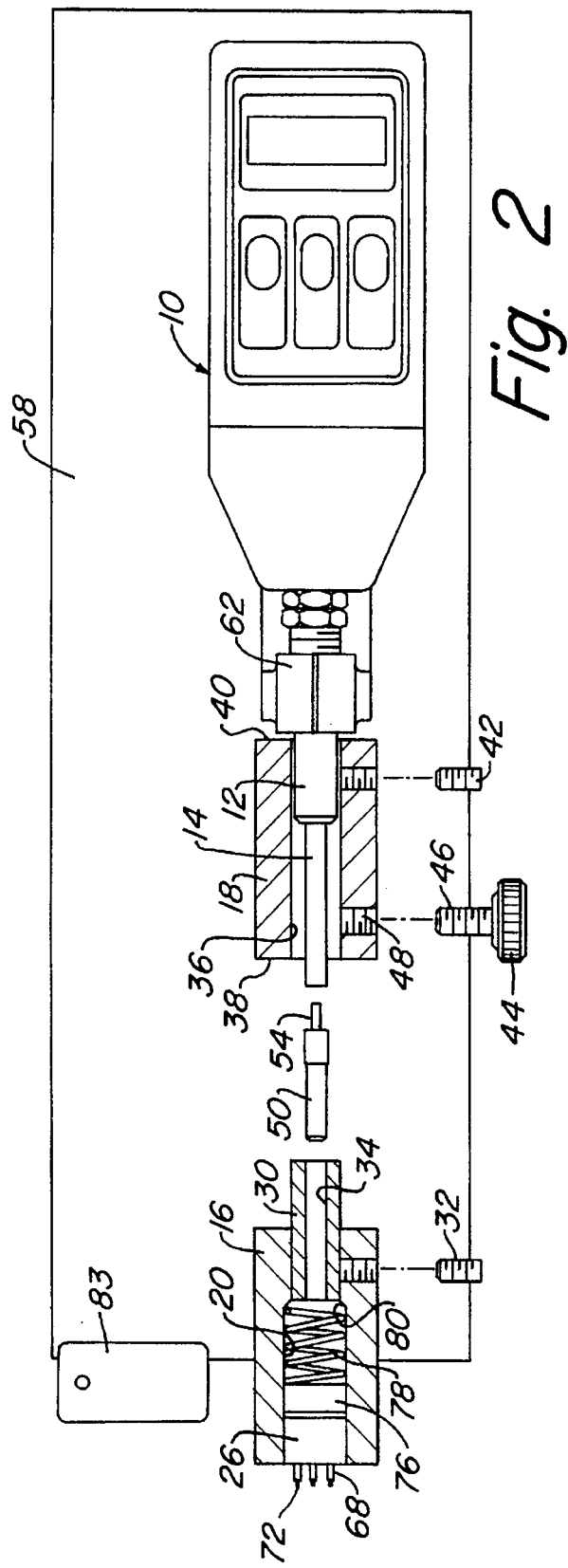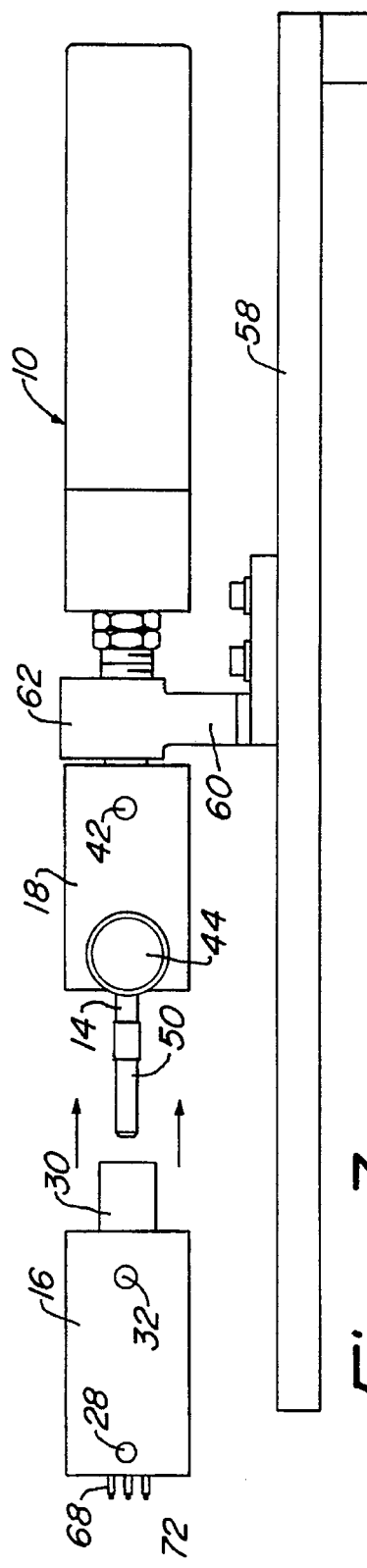

DEVICE FOR MEASURING WRENCHING HEIGHT OF HEXAGONAL HEAD FASTENERS

BACKGROUND OF THE INVENTION

1. Field of the Invention

This invention relates to a device for measuring wrenching height of polygonal head fasteners, particularly hexagonal head fasteners.

2. Description of the Prior Art

Hexagonal head screws, bolts or nuts must all meet minimum tolerances in order to avoid damage and to ensure proper functioning of the fastener during tightening and loosening operations. One of the characteristics of these fasteners is what is referred to as wrenching height. Wrenching height is the distance from the hex portion of the head where it first exceeds a minimum across corners dimension to the very bottom of the head. This characteristic indicates whether or not the hex is "filled out" sufficiently to ensure that a driver or socket engages the head in a manner so that the fastener can be driven without rounding off of the corners. If the wrenching height is outside of tolerances, torque applied to the head will likely damage the fastener during tightening and loosening.

Prior art methods of gaging wrenching height are difficult to carry out and are extremely time consuming. For these reasons, the wrenching height is not commonly gaged by fastener suppliers or end users. Prior art methods of measuring wrenching height require two separate readings or measurements. These methods typically involve providing a gaging ring having an inner diameter which is equal to the minimum across corners width of the hex head being measured. By stacking one, two, or three gaging rings over the top of the hex head, at right angles to the axis of the screw or bolt, acceptable wrenching height can be determined. At least 60% of the head height must protrude beyond the lower surface of the bottom ring to meet most minimum acceptable tolerances.

During measuring a hex head screw or bolt is placed in an indexing plate wherein a washer portion of the hex head seats against an upper surface of the indexing plate. A measurement is then taken after placing a gaging ring over the hex head. The hex head bolt is then removed and the gaging ring is lowered against the upper surface of the indexing plate so that a second measurement can be taken. The difference between the two readings is equal to the protrusion of the head beyond the gaging ring. If a washer is seated against the indexing plate, the washer thickness must be accounted for by subtracting this from the originally measured value of the hex head.

One of the problems associated with the prior art methods of measuring wrenching height is that micrometers used for this purpose are not commercially available. Each supplier or user will thus have a micrometer specially made for measuring wrenching height so that the micrometers will vary from user to user. During measuring, the gaging rings must be handled frequently and because the gaging rings are relatively small, they are easily misplaced or lost. Replacement of the gaging rings is usually quite expensive as they are manufactured with very close tolerances.

What is needed is a hex wrenching height gage which is easy to use and can determine the gaging height without repeated measurements and calculations, and which also minimizes the loss or mishandling of gaging rings used during measurement.

SUMMARY OF THE INVENTION

A device for measuring the wrenching height of a hexagonal head fastener has a height indicator having an indicator shaft which extends therefrom. The height indicator is actuated by reciprocal movement of the indicator shaft to record characteristics of a fastener being measured. A gaging element housing having an interior bore with a longitudinal axis is coupled to the height indicator with the indicator shaft extending into the interior bore. A gaging ring is fixed to the gaging element housing. The gaging ring has a central opening of a selected diameter for receiving a hexagonal head of the fastener being measured.

At least three pin holes are formed in the gaging ring and extend through its thickness. The pin holes are circumferentially spaced apart about the central opening of the gaging ring and are each in communication with the central opening along their lengths. At least three gaging pins are provided with the gaging ring. Each gaging pin is closely received within one of the pin holes and has a mid section and opposite inner and outer ends. The gaging pins are free to reciprocate between an inward and outward position within the pinholes so that the inner ends project within the interior bore of the gaging element housing, towards the indicator shaft, when moved to the inward position. A portion of each gaging pin may project radially into the central opening of the gaging ring so that each gaging pin contacts an area of the hexagonal head of the fastener being measured to prevent relative rotation of the gaging ring with the fastener during measuring.

A pin engagement body locates within the interior bore and is free to move longitudinally therein. The pin engagement body engages the indicator shaft as well as the inner ends of the gaging pin so that the movement of the pins is transmitted to the pin engagement body and causes the indicator shaft to actuate the height indicator. Biasing means is also provided for forcing the pin engagement body against the inner ends of the gaging pins so that the pins are normally biased in the outward position.

BRIEF DESCRIPTION OF THE DRAWINGS

FIG. 2 is a top view of the wrenching height gage device of the invention, showing the gaging element housing partially in cross-section and exploded away from the wrenching height gage indicator.

FIG. 3 is a side view of the measuring device of FIG. 2.

DETAILED DESCRIPTION OF THE PREFERRED EMBODIMENT

Figure 1:
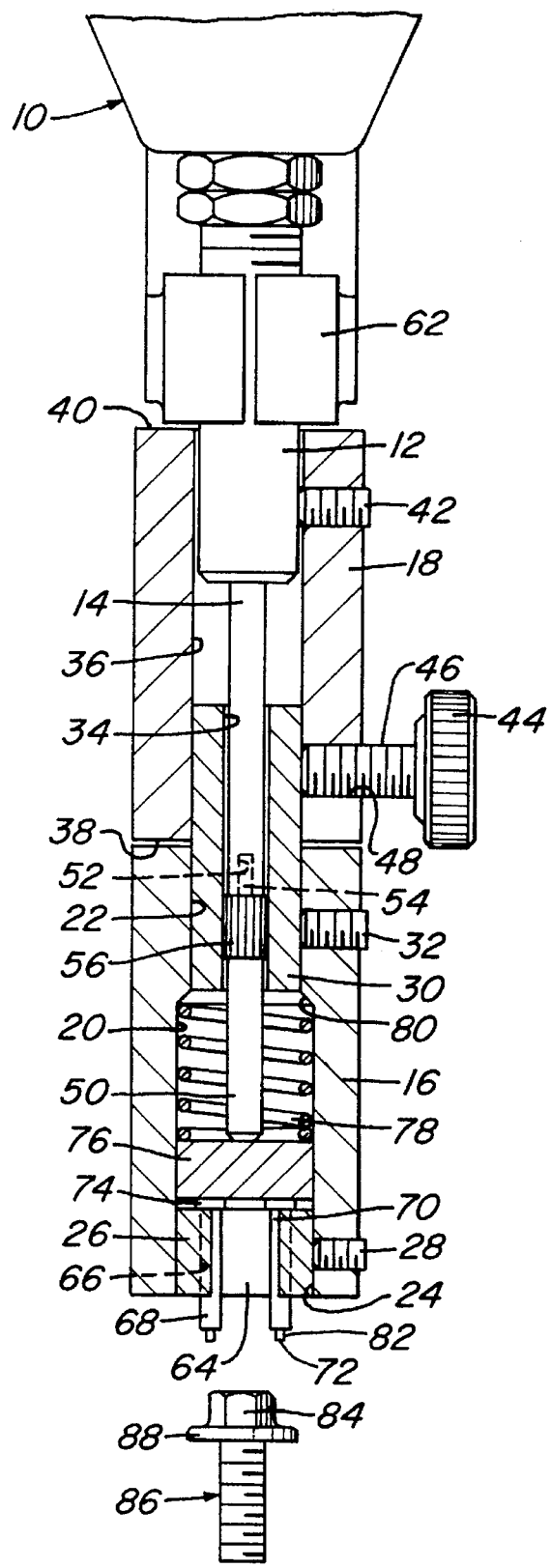
FIG. 1 is an isolated view of a gaging element housing having a gaging ring fixed therein which is attached to a wrenching height gage indicator and constructed in accordance with the invention.

Referring to FIGS. 1–3, a wrenching height measuring device that will measure the wrenching height of the hexagonal head fastener includes a wrenching height gage indicator 10 which preferably provides a digital readout of the wrenching height characteristic being measured. The indicator 10 is electronic and has a tubular extension 12 from which an indicator shaft 14 extends. The indicator 10 is actuated by the reciprocal movement of the indicator shaft 14 within the tubular extension 12 and records characteristics of the wrenching height being measured. The indicator 10 and indicator shaft 14 are known in the art and are commercially available as the quick-change "Recess-Cheker" system from Greenslade and Company, Inc. of Rockford, Ill.

The device of the invention includes a gaging element housing 16 which can be removeably attached to the indicator 10 by means of an adapter sleeve 18. The gaging element housing 16 has a generally cylindrical external configuration and an interior bore having opposite end openings 22, 24. As can be seen in FIG. 1, the end opening 22 is of lesser diameter than the end opening 24. The end opening 24 is sized to receive a gaging ring 26 having a generally cylindrical exterior. The gaging ring 26 is retained within the interior bore 20 of the gaging element housing 16 by means of a set screw 28 which extends through the sidewall of the housing 16 and into engagement with the exterior of the gaging ring 26.

A cylindrical bushing 30 is received within the end opening 22 of the interior bore 20 of the housing 16 and extends oppositely from the gaging ring 26. The bushing 30 is sized to be slidably yet snugly received within the interior bore 20 and is held in the position shown in FIG. 1 by means of a set screw 32. Approximately one-half of the overall length of the bushing 30 extends rearwardly from the end opening 22 of the gaging element housing 16. The cylindrical bushing 30 is provided with an internal bore 34.

The adapter sleeve 18 has a generally cylindrical external configuration, and a cylindrical interior. The adapter sleeve 18 has opposite ends 38, 40. The end 40 of the adapter sleeve 18 is adapted to be joined to the indicator 10 with the indicator shaft 14 being received within the interior 36. This is preferably accomplished by engaging a set screw 42 extending through the sidewall of the adapter sleeve 18 and into engagement with the tubular extension 12 of the indicator 10, when the tubular extension 12 is received within the interior 36 of the adapter sleeve 18. The opposing end 38 of the adapter sleeve 18 is adapted to be joined to the gaging element housing 16 with the bushing 30 being received at least partly within the interior 36. Approximately one-half of the overall length of the bushing 30 is slidably yet snugly received within the interior 36 of the adapter sleeve 18.

A thumb screw 44 near the end 38 of the adapter sleeve 18 extends through the wall of the adapter sleeve 18 and into engagement with the exterior of the cylindrical bushing 30. The thumb screw 44 has a threaded shaft 46 that is received within a mating bore 48 formed in the adapter sleeve 18. Movement of the threaded shaft 46 in the inward direction engages the exterior surface of the bushing 30 to releasably join the gaging element housing 16 to the adapter sleeve 18. Turning the thumb screw 44 in the outward direction releases the cylindrical bushing 30 and allows the housing 16 to be removed from the adapter sleeve 18 for the easy interchange of the gaging element housing 16.

As shown in FIGS. 1 and 2, an indicator shaft extension 50 extends from the indicator shaft 14 of the indicator 10 through the internal bore 34 of the bushing 30. Preferably, the shaft extension 50 has a generally cylindrical configuration allowing the extension 50 to be slidably received within the internal bore 34 of the cylindrical bushing 30. Most preferably, the indicator shaft 14 is provided with an internally threaded bore 52 which is engaged by an externally threaded shaft 54 of the shaft extension 50. This allows the indicator shaft extension 50 to be attached to the indicator shaft 14 by means of a screw coupling. A knurled region 56 assists in coupling and uncoupling the indicator shaft extension 50.

As shown in FIGS. 2 and 3, the indicator 10 may be supported on a base 58. The indicator 10 is joined to the base 58 by means of an arm 60 and collar 62.

Figure 4:
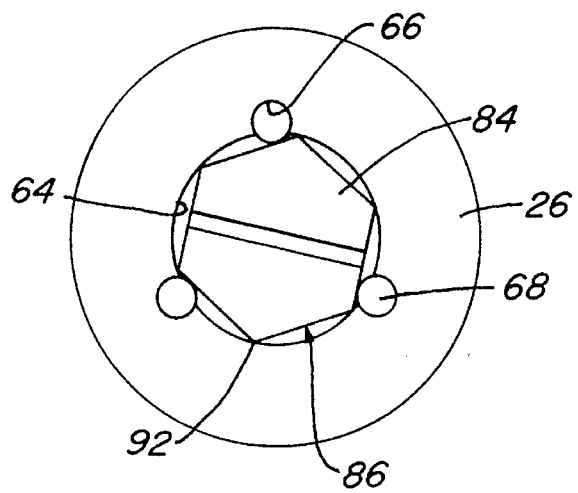
FIG. 4 is a top plan view of the gaging ring placed over a hexagonal head in accordance with the invention.
Figure 5:
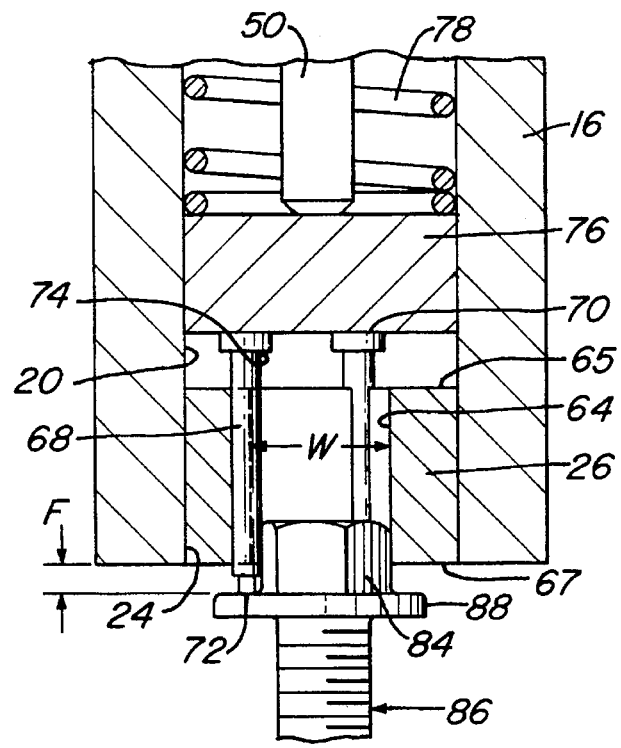
FIG. 5 is a cross-sectional side view of a gaging ring engaging a hexagonal washer head in accordance with the invention.
Figure 6:
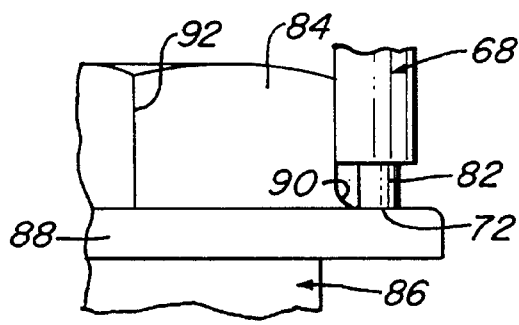
FIG. 6 is an enlarged view of a gaging pin contacting the flange of a hexagonal washer head and showing a stepped region of the gaging pin.

Now referring to FIGS. 4–6, the gaging ring 26 has a central circular opening 64 having a diameter which is sized within tolerances equal to the minimum across the corners width of the hexagonal head being measured. The gaging ring 26 has parallel opposite inner and outer ends or faces 65, 67 which intersect the central opening 64 to form sharply defined circumferential corners around the central opening 64.

Circumferentially spaced apart approximately 120° about the central opening 64 of the gaging ring 26 are three parallel pin holes 66. The pin holes 66 extend through the thickness of the gaging ring 26 from each of the opposite inner and outer faces 65, 67. As can be seen in FIG. 4, the pin holes 66 are cylindrical and communicate or intersect along their lengths with the central opening 64. Each pin hole 66 receives a cylindrical gaging pin 68. A portion of each gaging pin 68 partially protrudes within the central opening 64 along its length. Each of the gaging pins 68 has an inner end 70 and an outer end 72. The inner ends 70 of the gaging pins 68 project from the gaging ring 26 into the interior bore 20 of the housing 16.

A stop flange 74 is formed on each of the inner ends 70 of the pins 68. The stop flanges 74 retain the pins 68 within the pin holes 66, with the stop flanges 74 seating against the inner face 65 of the gaging ring 26 to prevent further movement of the pins 68 through the pin holes 66 when the pins 68 are moved away from the interior bore 20 to an outward or extended position, as shown in FIG. 1.

Located within the interior bore 20 of the housing 16 is a pin engagement body 76. The pin engagement body 76 is a solid member having a generally cylindrical shape which is sized to slidingly fit within the interior bore 20 so that it is free to move longitudinally within the bore 20. An outer face of the pin engagement body 76 abuts against the inner ends 70 of the gaging pins 68. The opposing inner face of the pin engagement body 76 is oriented to contact the free end of the indicator shaft extension 50. Surrounding the indicator shaft extension 50 and abutting against the pin engagement body 76 is a coiled spring 78 which is outwardly biased to force the pin engagement body 76 against the inner ends 70 of the gaging pins 68 so they are forced to the outward position. The end of the coiled spring 78 opposite the pin engagement 76 abuts against a tapered shoulder 80 (FIG. 1) formed within the interior bore 20. A smaller diameter portion 82 (FIG. 6) is located at the outer ends 72 of each of the gaging pins 68.

The operation of the device is as follows. With the gaging element housing 16 secured to the indicator 10 by means of the adapter sleeve 18 and cylindrical bushing 30, an appropriate gaging ring 26 for measuring the desired size hexagonal head fastener is fixed within the housing 16 with the gaging pins 68 inserted into the pin holes 66. When the gaging ring 26 is so secured, the pin engagement body 76 will force gaging pins 68 to the full outward position as shown in FIG. 1.

Prior to measuring, the indicator 10 is zeroed by means of a zeroing plate 83 (FIG. 2) which is placed firmly and flatly against the end face of the housing 16. As shown in FIG. 1, the gaging ring 26 should be flush with the end of the housing 16 when it is secured to the gaging element housing 16. By positioning the zeroing plate 83 against the end of a housing 16 and gaging ring 26, the gaging pins 68 will be forced to a full inward position within the interior bore 20, towards the indicator shaft 14, so that the pin engagement body 76 is forced upward against the coiled spring 78, forcing the indicator shaft extension 50 and indicator shaft 14 to a zero position.

After zeroing the indicator 10, a hexagonal head, such as the hexagonal screw head 84 (FIG. 1) of screw 86, is positioned or aligned with the central opening 64 of the gaging ring 26. Frequently, screw 86 will also have an integrally formed washer portion 88. As shown in FIG. 6, a bevel or fillet 90 is located at the junction of washer 88 with head 84. It should be noted that a variety of hexagonal heads could be measured using the device of the invention. For instance hex washer head screws, hex head screws and bolts without integral washers, and hex flange head screws and nuts can all be measured with the device.

The drive flats of head 84 taper slightly, creating a larger across corners dimension towards the base of the head 84 adjacent to the washer 88 than at the upper end of the head 84. As shown in FIGS. 4 and 5, the head 84 is positioned within the central opening 64 with the longitudinal axis of the screw 86 being coaxial with the longitudinal axis of the central opening 64 and the outer ends 72 of the gaging pins 68 resting on the upper surface of the washer 88. As the head 64 is inserted into the central opening 64, the corners formed by the junction of the outer face 67 with the central opening 64 will engage the corners 92 of the head 84 at the point where the across corners dimension exceeds the diameter of the central opening 64. At this point the head 84 can not extend any further inward into the central opening 64. As seen in FIG. 4, when the gaging ring 26 is placed over the hex head 84, the sidewall portion of the gaging pins 68 radially projecting within the central opening 64 will contact the flats of the hex head 84 to prevent relative rotation of the hex head within the central opening 64 during measuring.

The washer portion 88 provides an area for contacting the outer ends 72 of the gaging pins 68. As seen in FIG. 6, the smaller diameter region 82 at the outer end 72 of the gaging pins 68 provides clearance for the fillet 90, which is commonly present on hex heads wherein the washer portion 88 is integrally formed thereon where the larger diameter portion of the gaging pins 68 would not. As the hexagonal head 84 is inserted into the central opening 64, the gaging pins 68 are forced by the washer 88 through the pin holes 68 towards the inward position, as shown in FIG. 5. This causes the pin engagement body 76 to be forced against the coiled spring 78 and forces the extension 50 and indicator shaft 14 inward so that a reading is measured by the indicator 10. The distance that the pins 68 project from the gaging ring 26 as measured by the indicator 10 when the hex head 84 is inserted as far as possible into the central opening 64 is the wrenching height of the measured hex head and is indicated as height F in FIG. 5.

The hex head 84 can then be removed and another hex head of similar dimensions can be measured in the same manner without removing the gaging ring 26. If necessary, hexagonal head fasteners, if not provided with an integral washer portion may be measured in a similar manner by merely placing a flat washer against the lower or bottom face of the hexagonal head in an abutting relationship to provide a base line of the hex head area where the gaging pins 68 may rest. The procedure for measuring the wrenching height F would be the same as previously described.

The device of the invention has several advantages over the prior art. Because the gaging ring is fixed within an element housing, there is little chance of loosing or dropping the gaging ring when measuring numerous hex heads. After the indicator is zeroed, the fastener to be measured is positioned within the central opening so that a measurement is given, indicating the exact wrenching height. There is no need to calculate or take into account the difference due to the thickness of the washer portion of the hex head as in prior art methods.

While the invention has been shown in only one of its forms, it should be apparent to those skilled in the art that it is not so limited but is susceptible to various changes without departing from the scope of the invention. For instance, although the embodiment shown is for a hexagonal head fastener, it should be apparent to those skilled in the art that other polygonal fastener heads could be measured in a similar manner as well.

I claim:

1. A device for measuring wrenching height of polygonal head fasteners, the device comprising in combination:

a linear dimension indicator having an indicator shaft extending therefrom, the indicator being actuable by reciprocal movement of the indicator shaft to indicate a linear dimension of a fastener being measured;

a gaging element housing having an interior bore with a longitudinal axis, the gaging element housing coupling to the indicator with the indicator shaft extending into the interior bore;

a gaging ring which is coaxially fixed to the gaging element housing, the gaging ring having a central opening of a selected diameter for partially receiving a polygonal head of a fastener being measured, the gaging ring having at least three pin holes which extend through the gaging ring parallel to the longitudinal axis and which are circumferentially spaced apart about the central opening;

at least three gaging pins, each pin being closely received within one of the pin holes, the pins having opposite inner and outer ends, the gaging pins being free to reciprocate between an inward and an outward position within the pin holes so that the outer ends contact a base line area of the fastener and the inner ends project within the interior bore towards the indicator shaft when moved to the inward position; and translation means for causing the movement of the pins to move the indicator shaft in unison therewith to thereby cause the indicator to indicate wrenching height.

2. The device of claim 1, wherein the translation means comprises:

a pin engagement body which locates within the interior bore and is free to move longitudinally therein, the pin engagement body engaging the indicator shaft and the inner ends of the gaging pins so that movement of the pins is transmitted to the pin engagement body to the indicator shaft.

3. The device of claim 2, further comprising:

biasing means for forcing the pin engagement body against the inner ends of the at least three gaging pins so that the pins are projected to the outward position.

4. The device of claim 3, wherein:

the biasing means comprises a coiled spring.

5. The device of claim 1, wherein:

the gaging ring is releasably fixed to the gaging element housing to facilitate removal and replacement of the gaging ring.

6. The device of claim 1, wherein:

the inner ends of the gaging pins are provided with stop flanges which prevent movement of the gaging pins through the pin holes beyond the outward position.

7. The device of claim 1, wherein:

the pin holes are spaced approximately 120 degrees apart.

8. The device of claim 1, wherein:

the pin holes intersect with the central opening of the gaging ring so that a portion of each gaging pin projects radially into the central opening, said portion of each gaging pin contacting an area of the polygonal head of the fastener being measured to prevent relative rotation of the polygonal head within the central opening.

9. The device of claim 1, wherein:

a reduced cross-sectional area portion is on the outer end of each of the gaging pins for clearing contact with a fillet on polygonal head fasteners which have integral washers.

10. The device of claim 1, wherein:

the interior bore of the gaging element housing has opposite end openings; and further comprising a bushing retained within the interior bore of the housing and extending from one of the end openings, the bushing having an internal bore;

an adapter sleeve having an interior and opposing ends, one of the opposing ends being adapted to be joined to the indicator with the indicator shaft received within the interior thereof, the other of the opposing ends being adapted to be joined to the gaging element housing with the bushing received at least partly within the interior thereof; and releasable means for releasably joining the gaging element housing to the adapter sleeve.

11. A device for measuring wrenching height of hexagonal head fasteners, the device comprising in combination:

a linear dimension indicator having an indicator shaft extending therefrom, the indicator being actuable by reciprocal movement of the indicator shaft to indicate a linear dimension of a fastener being measured;

a gaging element housing having an interior bore with a longitudinal axis, the gaging element housing coupling to the indicator with the indicator shaft extending into the interior bore;

a gaging ring which is coaxially fixed to the gaging element housing, the gaging ring having a central opening of a selected diameter for partially receiving a hexagonal head of the fastener being measured, the gaging ring having at least three pin holes which extend through the gaging ring parallel with the longitudinal axis and which are circumferentially spaced apart about the central opening, the pin holes each intersecting with the central opening along the length of the holes;

at least three gaging pins, each pin being closely received within one of the pin holes, the pins having opposite inner and outer ends, the gaging pins being free to reciprocate between an inward and an outward position within the pin holes so that the outer ends project outward from the gaging ring for contacting a base line area of the fastener and the inner ends project within the interior bore towards the indicator shaft when moved to the inward position, a portion of each gaging pin projecting radially into the central opening so that each gaging pin contacts a drive flat area of the hexagonal head of the fastener being measured to prevent relative rotation of the hexagonal head within the central opening during measuring;

a pin engagement body which locates within the interior bore and is free to move longitudinally therein, the pin engagement body engaging the indicator shaft and the inner ends of the gaging pins so that movement of the pins moves the indicator shaft to thereby actuate the height indicator; and biasing means for forcing the pin engagement body against the inner ends of the at least three gaging pins so that the pins are urged to the outward position.

12. The device of claim 11, wherein:

the biasing means comprises a coiled spring.

13. The device of claim 11, wherein:

the gaging ring is releasably fixed to the gaging element housing to facilitate removal and replacement of the gaging ring.

14. The device of claim 11, wherein:

the inner ends of the gaging pins are provided with stop flanges which prevent movement of the gaging pins through the pin holes beyond the outward position.

15. The device of claim 11, wherein:

the pin holes are spaced approximately 120 degrees apart.

16. The device of claim 11, wherein:

a reduced diameter portion is on the outer end of each gaging pin for clearing contact with a fillet on polygonal head fasteners which have integral washers.

17. The device of claim 11, wherein:

the interior bore of the gaging element housing has opposite end openings; and further comprising a bushing retained within the interior bore of the housing and extending from one of the end openings, the bushing having an internal bore;

an adapter sleeve having an interior and opposing ends, one of the opposing ends being adapted to be joined to the height indicator with the indicator shaft received within the interior thereof, the other of the opposing ends being adapted to be joined to the gaging element housing with the bushing received at least partly within the interior thereof; and releasable means for releasably joining the gaging element housing to the adapter sleeve.

18. A method of measuring wrenching height of a polygonal head fastener comprising the steps of:

providing a gaging element housing having an interior bore with a longitudinal axis;

providing a gaging ring which is fixed to the gaging element housing, the gaging ring having a central opening of a selected diameter for receiving an upper portion of a slightly tapered polygonal head of the fastener being measured;

mounting in the gaging element housing at least three pins coaxially around the longitudinal axis for reciprocal longitudinal movement relative to the gaging element housing between inward and outward positions;

determining a zero point in which each of the pins is located in a full inward position;

providing the fastener with a washer portion so that a base line area of the polygonal head is established;

contacting the pins with the washer portion and moving the polygonal head into the central opening so that the pins move toward the zero position until movement of the polygonal head is prevented by the gaging ring; and measuring the distance between the outward protrusion of pins at the point where movement of the polygonal head is prevented by the gaging ring and the zero point to determine the wrenching height.

* * * * *